Figure 1:
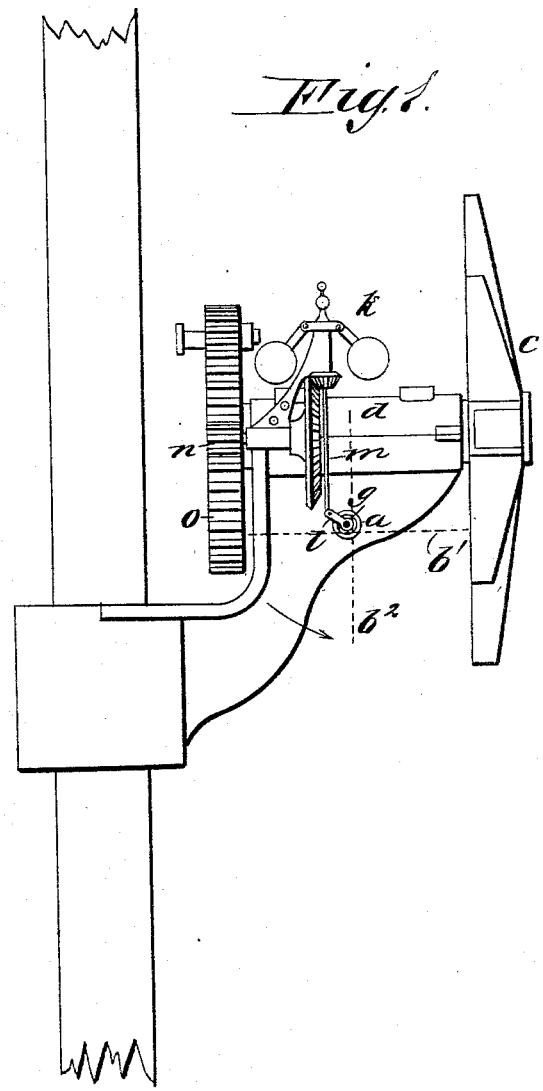

(No Model.) 3 Sheets—Sheet 1.

D. D., G. L., & C. W. WILEY.
WINDMILL.

No. 323,615. Patented Aug. 4, 1885.

WITNESSES:

INVENTOR:
Daniel D. Wiley
George L. Wiley
Charles W. Wiley
BY Munn & Co
ATTORNEYS.

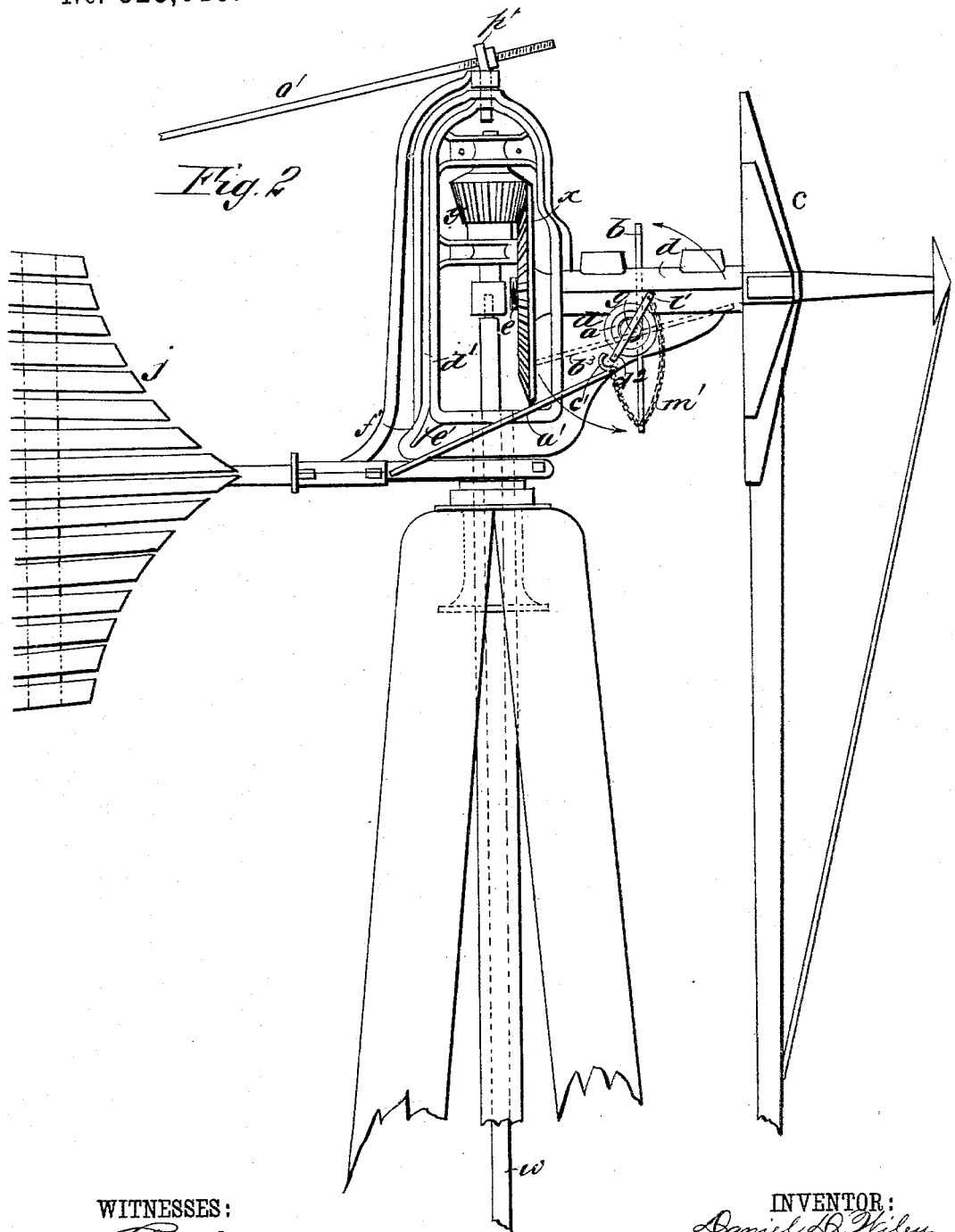

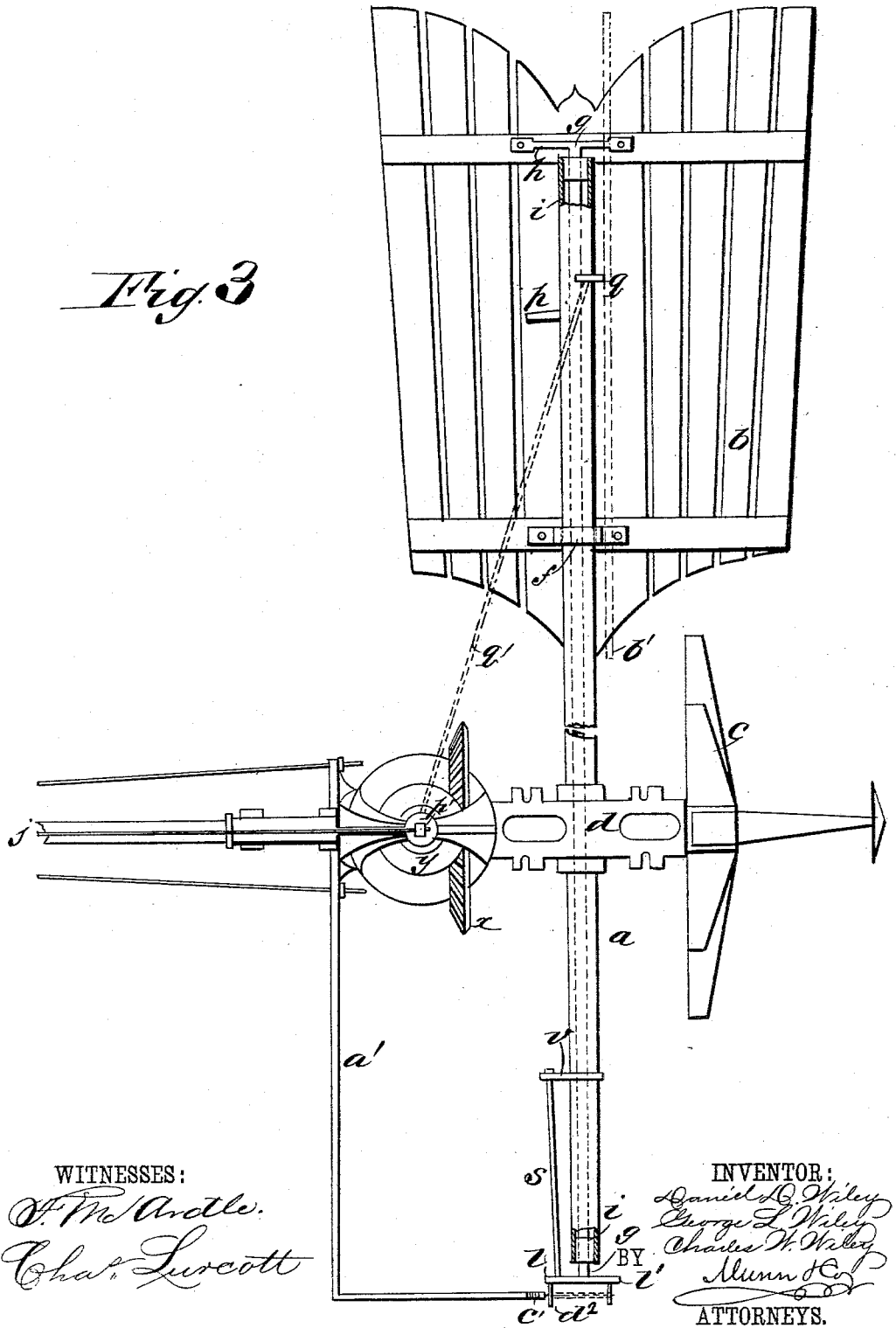

UNITED STATES PATENT OFFICE.

DANIEL D. WILEY, GEORGE L. WILEY, AND CHARLES W. WILEY, OF LANARK, ILLINOIS.

WINDMILL.

SPECIFICATION forming part of Letters Patent No. 323,615, dated August 4, 1885.

Application filed September 17, 1884. (No model.)

*To all whom it may concern:*

Be it known that we, DANIEL D. WILEY, GEORGE L. WILEY, and CHARLES W. WILEY, all of Lanark, in the county of Carroll and State of Illinois, have invented a new and Improved Windmill, of which the following is a full, clear, and exact description.

Our invention consists of improved contrivances for mounting the side vane so that it will turn more easily to enable it to be automatically shifted for varying the surface presented to the wind for a means of making the wheel automatically variable to the variations in the power of the wind for regulating the power of the wheel and for the protection of it from damage in powerful wind-gusts.

Our invention also consists of improved contrivances for so automatically shifting the side vane; and it also consists of improved contrivances whereby said side vane may be used as an automatic regulator to prevent the wheel from being suddenly thrust around with the shaft in geared mills when the load is suddenly turned on or clutched with the shaft, all as hereinafter fully described.

Reference is to be had to the accompanying drawings, forming part of this specification, in which similar letters of reference indicate corresponding parts in all the figures.

Figure 1 is a side elevation of a portion of our improved mill, showing the application for a ball-governor for regulating the side vane. Fig. 2 is a side view, and Fig. 3 is a plan view.

We make the arm $a$, for the support of the side vane, $b$, and for the lever by which said side vane is to shift the wheel $c$, to consist of a tube, which we mount rigidly on the turntable arm $d$, that supports the shaft $e$ of the wheel, extending said tubular arm about as far as the rear end of the side vane, $b$, and also extending said arm $a$ on the other side of wheel-supporting arm $d$, as represented in Fig. 3, in some cases, and we mount the vane $b$ on this tube by a clip, $f$, near its front end, fitted to turn freely on the tube, and by a rod, $g$, secured by a tie-head, $h$, to the vane near its rear end, and extending entirely through the tubular arm, in which it is fitted with bearing-boxes $i$ for being supported substantially and so as to turn with the least amount of friction, and thus enabling it to turn so lightly that a ball-governor of ordinary capacity may be competent to shift it into and out of the wind for regulating the wheel, which would be entirely inefficient were the ordinary arm used and fitted to turn in a bearing of arm $d$, and, beside, the arrangement for the support of the vane is much more substantial and durable. This vane $b$ normally rests in the position represented in Fig. 3—that is, edgewise to the wind—when the wheel $c$ is working normally—that is, when it is facing the wind—in which position it is held by the tail-vane $j$, and by the weighted cord usually employed to hold the wheel with its shaft in the line of the tail-vane; but when the wind blows too hard for the wheel the vane $b$ is made to turn up sidewise to the wind more or less, to be forced around, thereby to swing the wheel around partially out of the wind to diminish the effect of the wheel.

In some cases we propose to employ a ball-governor, $k$, for turning the vane, as represented in Fig. 1, the governor actuated by the variations in the speed of the wheel, as such governors are actuated when used for regulating the speed of steam and other engines; but we will in other cases utilize the wind for shifting the vane into the wind, and a spring for retaining the vane edgewise thereto, as represented in Fig. 3, the area of the vane being greater on one side of the rod than the other. When we use the governor, the tubular arm $a$ will either terminate at the front side of the supporting-arm $d$ or will have a notch or slot to allow the crank $l$ to be fitted to the rod $g$ thereat, and the shifting-rod $m$ of the governor will be connected to said crank, the governor being geared by the pinion $n$ on its driving-shaft with the toothed crank-disk $o$ of the wind-wheel, or arranged in any other approved connection with the wind-wheel shaft.

When the speed of the wind-wheel is normal, the vane will rest in the horizontal position represented by the dotted line $b'$, Fig. 1; but with undue increase of speed the crank $l$ will be turned by the rising of the balls of the governor, shifting the vane more or less toward the line $b^2$, and thus presenting the surface of the vane to the wind proportionately to the force of the latter, by which the wheel $c$ will be turned more or less obliquely to the wind, the effect of which will be graduated on the wheel thereby.

When we use an unbalanced vane, $b$, to be turned into the wind by the greater effect of the wind on one side than on the other, we arrange a stop, $p$, on the arm $a$, against which the vane comes to rest in its normal position, slightly inclined to the wind, as represented by the dotted lines $b^3$, Fig. 2, with its widest side to windward, so that it will be turned upward and sidewise to the wind when the power of the wind is too great for the wheel. The arm $a$ is also provided with a stop, $q$, to prevent the vane from being turned beyond the vertical plane.

For the spring to resist the wind and to return the vane $b$ to the normal position, we employ a spring-rod, $s$, connecting it to the crank $l$ at one end and to a supporting-arm, $v$, at the other end, said supporting-arm being attached to the tubular arm $a$, which in this arrangement is preferably extended forward of the wheel supporting arm $d$, but not necessarily so.

When the wind-wheel is geared to a vertical shaft, $w$, by bevel-wheels $xy$ or any equivalent means, the wheel is often thrust around out of the wind to some extent when the shaft is momentarily slowed by the sudden increase of its load or resistance, as by the clutching on of another machine, and it always tends that way more or less by the resistance of the load. This materially lessens the power of the machine, and especially at the moment when its utmost power is most needed, and its avoidance is highly desirable, and may be effected by the use of this rotating side vane, $b$, which we propose to utilize therefor as follows: On the arm of the tail-vane $j$, by which the wheel $c$ is always made to face the wind when at work, we arrange an arm, $a'$, for the support of a stop, $c'$, in suitable proximity to crank-pin $d^2$ of crank $l$ to turn vane $b$ into the wind whenever the wheel begins to swing by the stopping or slowing of the shaft, and thus enable the effect of the wind on the side vane to resist the turning of the wheel, the crank $l$ being in this case mounted at the extremity of the long extension of the arm $a$ in front of the wheel-arm $d$, where the range of the arm will be sufficient to effect the necessary change of the vane $b$ by a slight deflection of the wheel from its true position. The same spring $s$ that is used to return the vane $b$ to the normal position when used as a regulator of the wheel to the power of the wind may be used in this case, and this device may also be employed where said vane is also employed for such regulator.

In the use of this device for resisting the thrusts of the irregular load on the wheel we locate the stop-lug $e'$ of the wheel-arm-supporting frame $d'$ so that when the wheel is in the normal position there will be sufficient space between said lug and the tail-vane-supporting frame $f'$ to allow the wheel to turn the requisite amount for shifting the side vane, $b$, by the stop $c'$ without contact of said lug $e'$ with said frame $f'$, thus enabling the tail-vane to remain in its proper position by the thrusts of the wheel as it is in the common arrangement of said lug close to the frame $f'$ when the wheel is in line with the tail-vane, said lug being used in this as a safeguard against any undue shifting of the wheel in that direction for any cause. Its use in common mills is to keep the wheel from swinging past the line of the tail-vane, for which it is necessarily arranged in contact with frame $f'$, as above stated.

In order to cause the vane $b$ to turn up vertically when the wheel is shifted around parallel with the tail-vane, so as to present a symmetrical appearance when the machine is at rest, we construct the crank $l$ with an arm, $l'$, extending in the opposite direction from shaft $g$ and connect a chain, $m'$, to said arm, and to the end of stop-arm $a'$, said chain being of such length that it will hang slack, as in Fig. 2, when the machine is at work, but will come taut and turn said vane when the wheel is shifted around to the tail-vane as above stated. The tail-vane is stayed by a truss-rod, $o'$, suspended from the head of the pivot $p'$ of the wheel-supporting frame $d'$, and the arm $a$ may be stayed by a similar rod, $q'$, but this rod must be fitted to the pivot $p'$ so as to turn on it as the wheel-support shifts around.

Having thus described our invention, what we claim as new, and desire to secure by Letters Patent, is—

1. The side vane of a wind-wheel, arranged to turn on the tubular supporting-arm $a$, and having a crank-shaft extending through said supporting-arm and acting by one of its crank-pins upon a rod supporting a stop and connecting with the vane-shaft, adapted to automatically shift said vane for regulating the wind-wheel, substantially as described.

2. The combination of a spring, $s$, with the unbalanced side vane, $b$, mounted on the tubular supporting-arm $a$, and having the shaft $g$ extending through said arm and connected to said spring by a crank, said vane having stops $p$ and $q$, substantially as described.

3. The side vane, $b$, arranged to turn on its supporting-arm $a$, and having a crank-arm, $l$, in combination with the stop $c'$, supported on the tail-vane, the crank and the stop being arranged to actuate the side vane when the wheel shifts around by the back thrusts on the driving-shaft, substantially as described.

4. In a windmill having the shifting side vane $b$, crank-arm $l$, and stop $c'$, the stop-lug $e'$, located upon frame $d'$ and with relation to frame $f'$ as described, to allow the vane to be actuated by the stop $c'$, substantially as herein set forth.

5. The side vane, $b$, arranged to turn on its supporting-arm $a$, and having a crank-shaft with a pin or arm acting upon a stop of a rod connected with the vane-shaft for automatically shifting it to regulate the wind-wheel, and also having the frame turning with the wheel provided with a stop, $e'$, engaging with the frame or support $f'$ for automatically shifting it to resist the turning of the wheel around the shaft $w$ by the back thrusts on the same, substantially as herein set forth.

6. The side vane arranged to turn on its supporting-arm $a$, and having a chain, $m'$, connected to its arm, $l'$, and also connected to a fixed object suitable for turning said vane upright when the wheel is shifted around parallel with the tail-vane, substantially as described.

DANIEL D. WILEY.
GEORGE L. WILEY.
CHARLES W. WILEY.

Witnesses:
D. W. DAME,
J. S. WILSON.